United States Patent [19]

Schaff et al.

[11] Patent Number: 4,500,175

[45] Date of Patent: Feb. 19, 1985

[54] METHOD AND APPARATUS FOR LIGHT CHOPPING BY ACOUSTO-OPTIC REFRACTION

[75] Inventors: Fredrick L. Schaff, Ellicott City, Md.; Milton Gottlieb, Churchill, Pa.

[73] Assignee: Westinghouse Electric Corp., Pittsburgh, Pa.

[21] Appl. No.: 431,472

[22] Filed: Sep. 30, 1982

[51] Int. Cl.³ .............................................. G02F 1/11
[52] U.S. Cl. ................................................... 350/358
[58] Field of Search ........................................ 350/358

[56] References Cited

U.S. PATENT DOCUMENTS 3,994,569 11/1976 Isaacs et al. ...................... 350/358
3,994,600 11/1976 Tarasenich et al. ............ 350/6.6 X Primary Examiner—John K. Corbin
Assistant Examiner—Lynn Vandenburgh Kent
Attorney, Agent, or Firm—T. R. Trempus

[57] ABSTRACT

The invention is a method and apparatus for the refraction of an optical ray from a first focal point to at least one other focal point. The method includes the steps of passing the optical ray through an optical medium to establish a first focal point and then launching acoustic waves into the optical medium to induce at least one half standing acoustic wave within the optical medium. The induced refractive index gradient deviates the optical ray from the first focal point to at least one other focal point. This method of induced refraction can be utilized as a chopper in one embodiment and as a high energy dissipation means in an alternative embodiment.

13 Claims, 6 Drawing Figures

METHOD AND APPARATUS FOR LIGHT CHOPPING BY ACOUSTO-OPTIC REFRACTION

BACKGROUND OF THE INVENTION

The invention relates to acousto-optic devices generally and, more particularly, the invention is directed to an acousto-optic device for the modulation of a light beam through refraction. The use of the term "light" herein is understood to include the infrared spectral range.

Many photon energy detection systems require a chopper, i.e., an optical ON/OFF switch between the impinging energy and the detector. Ideally this switch functions as a perfect square wave such that it has infinitely fast switching time, 100% transmission when ON, zero transmission when OFF, and can be varied in chopping frequency and ON/OFF time ratios. In practice, the most common chopper is a motor driven disc made up of alternating gaps and solid strips. They normally provide the 100% transmission when ON, zero transmission when OFF, and can usually be made to operate over magnitudes of chopping frequency (using interchangeable discs with various numbers of open/closed section pairs). However, the motor driven chopper does not have very fast rise and fall time as a percent of open/closed time, has considerable phase jitter, and has a very limited upper chopping frequency (approximately 5 khz). Moreover, such mechanical devices exhibit very poor reliability when utilized in long life airborne or spaceborne optical sensor systems.

It is one object of this invention to provide a solid state chopper which has excellent transmission throughout the normally used visible and infrared bands, has a high extinction ratio, a very broad range of chopping frequencies, extremely fast rise/fall times which are constant over the chopping frequency range, has practically no frequency/phase jitter, and has the reliability typically associated with solid-state electronic devices.

It is another object of this invention to provide an acousto-optic device capable of diverting incoming energy from its normal optical path and scattering this energy harmlessly within the optical system.

It is yet another object of this invention to provide a technique for modifying the focal point of an optical ray through acousto-optical reaction.

SUMMARY OF THE INVENTION

This invention is directed to a method of refracting an optical ray from a first established focal point to at least one other focal point and an apparatus for effecting the aforedescribed refraction. According to the instant method, the optical ray is passed through an optical medium to establish the first focal point in a quiescent mode of operation. Acoustic waves are launched into the optical medium. The acoustic waves are normal to the optical path within the medium and induce within the medium a refractive index gradient which causes a cylindrical lens-like structure to be formed so that the optical rays are deviated from their original path and are no longer focused on the original focal point.

The acousto-optic apparatus which effects the refraction of the optical ray includes an optical medium with a pair of parallel sides normal to the path of the optical ray within the medium. At least one transducer is provided on one of the parallel sides to selectively launch acoustic waves into the medium. A pair of transducers with phase shifted inputs can be provided in an alternative embodiment.

In another embodiment contoured input and output faces are provided on the optical medium to further refract the optical rays passing therethrough.

When combined with a device for the detection of large optical energy emissions, the method and apparatus of this invention can be utilized to dissipate the emissions and thus protect other optical components within an infrared system.

BRIEF DESCRIPTION OF THE DRAWINGS

The above as well as other features and advantages of this invention will become apparent through consideration of the detailed description in connection with the accompanying drawings in which:

FIG. 5 is a schematical illustration of an acousto-optic refractive modulator for the control of large optical energy emissions or the like.

DETAILED DESCRIPTION OF THE INVENTION

An acousto-optic tunable filter operates through the interaction of acoustic waves with light waves in a suitable crystal. Typically, an acoustic transducer is bonded to an optical crystal, and is driven by a controllable RF signal, whose frequency determines the wavelength of light that is passed by the acousto-optic tunable filter. Various optical materials have been developed for use in acousto-optic devices, these materials include: thallium-arsenic-selenide as described in U.S. Pat. No. 3,792,297, thallium-phosphorous-selenide per U.S. Pat. No. 3,929,970 and thallium-arsenic-sulfide per U.S. Pat. No. 3,799,659, all assigned to the assignee of the present invention and incorporated herein by reference. A complete description of the operation of an acousto-optic device can be had from the article "Automated Acousto-Optic Tunable Filter Infrared Analyzer", from the Proceedings of the SPIE—*The International Society of Optical Engineering*, Vol. 268, 1981, pp. 160-166.

Figure 1:
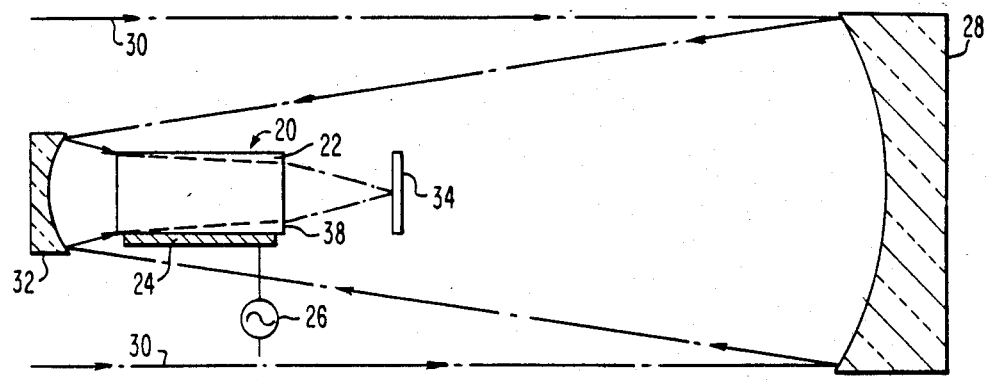
FIG. 1 is a schematical representation of an acousto-optic modulation device in a quiescent state according to the teachings of this invention, positioned within an optical system.

Turning to FIG. 1, an acousto-optic device functioning as a refractive modulator or "chopper" according to this invention is generally indicated by the reference character 20. The acousto-optic device 20 includes a crystal 22 which is reasonably transmissive in the wavelength of interest and has a relatively large and constant index of refraction, a transducer 24 which is bonded to a side of the crystal 22 generally normal to the incoming light beam and a means 26 for generating an input signal to the transducer 24. The acousto-optic chopper 20 is illustrated in an optical system consisting of a primary concave reflective surface 28 which focuses the incoming optical energy 30 onto a secondary concave reflective surface 32 which typically focuses the optical energy 30 on a detector means 34. It is, of course, possible to utilize this invention in a single mirror system or in various other devices or systems where it may be desired to chop at variable repetition frequencies, duty cycle and contrast ratio, and over a range of wavelengths. The acousto-optic chopper 20 is aligned in front of the detector means 34 such that no optical ray is normal to the face 36 of the acousto-optic chopper 20. While in theory, an on-axis optical beam normal to the acoustic-wave source would not be refracted, experimental results show deflection of even these light rays with the empirical implication that all incoming energy, regardless of input angle to the optical face 36 is deflected. This concept should be more readily appreciated in view of an alternative embodiment of this invention set forth below. However, for illustrative purposes, the optical path is designed such that the optical rays from the edge of the reflective system, i.e. mirror 32, just touches the edge of the chopper and at such a steep angle of incidence that, in the absence of the acousto-optic chopper 20, the rays would focus just behind the face 36 of the acousto-optic chopper 20.

As previously indicated, the optical medium 22 preferably has a large index of refraction which causes the optical rays to now approach a focus to the right of that obtained without the chopper being present. A suitable optical material is germanium. The length "l" of the acousto-optic chopper 20 is selected to be slightly less than the length at which focus would occur within the chopper. The optical rays exiting the output face 38 of the acousto-optic chopper 20 return to their steep angle of convergence and focus shortly behind the acousto-optic chopper 20 where the detector array 34 is located. The totally quiescent state of the acousto-optic chopper is illustrated in the "chopper-open" condition of FIG. 1.

Figure 2:
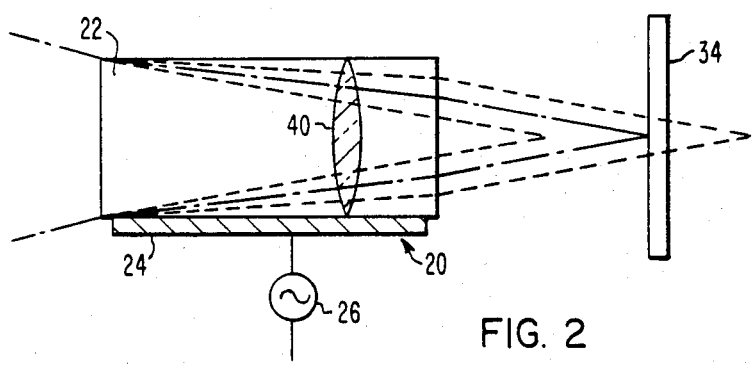
FIG. 2 is a schematical representation of an acousto-optic modulation device in a single transducer embodiment.

Considering FIG. 2, the basic concept of this invention by which the "chopping" action is effected is schematically represented. Optical material can function as a refractive lens element of varying focal length in the presence of acoustical energy. The frequency of the acoustic wave is selected so that a standing wave is set up with one, or a few, anti-nodes within the optical medium 22. When the acoustic wave is applied to the optical medium through the transducer 24, the induced refractive-index gradient causes a cylindrical lens-like structure, schematically shown at 40 (for a single anti-node), to be formed so that the light rays are deviated from their original paths and are no longer focused at the original point; i.e., the detector means 34. The lensing effect varies sinusoidally with time, so that for one-half of the rf cycle the lens is positive (the index gradient is negative), and for the other half of the cycle the lens is negative (the index gradient is positive). A high contrast ratio is achieved by redirecting as many rays as possible away from the detector means 34.

Figure 3:
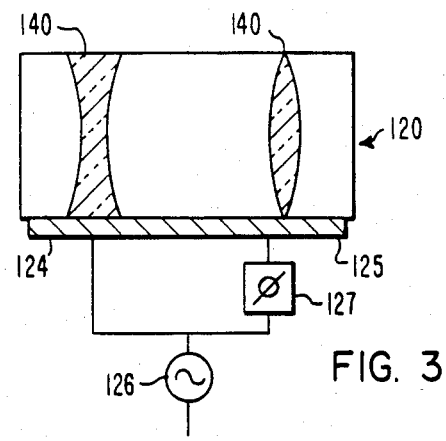
FIG. 3 is a schematical representation of an acousto-optic modulation device in a two phase, dual transducer embodiment.
Figure 4:
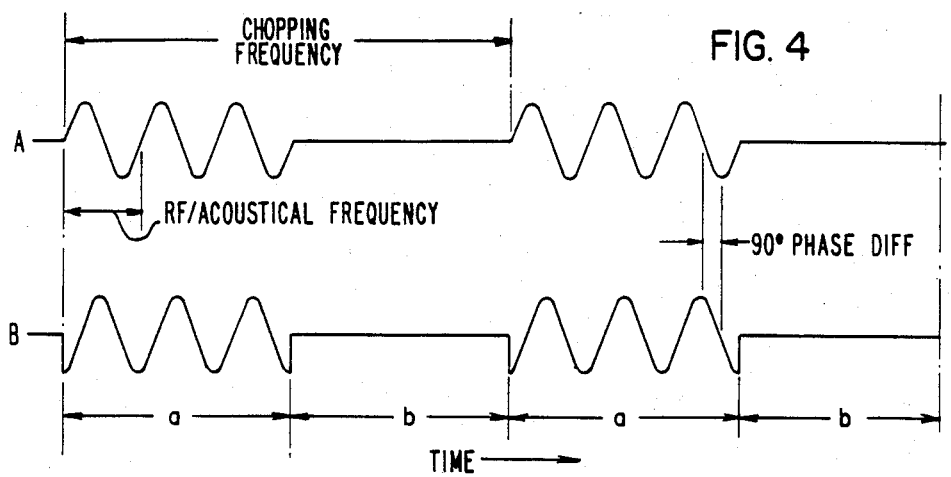
FIG. 4 illustrates a pair of wave forms demonstrating the phase shift and chopping frequency of the acousto-optic modulation device of FIG. 3.

In the single transducer structure of FIG. 2, the lensing effect disappears twice each cycle as the acoustic intensity goes to zero, allowing the light to be refocused on the detector means. This results in the imposition of the driving frequency (multiplied by 2) on the chopping frequency as determined by the on-off switching of the acoustic signal input device 26. This can be avoided in the configuration shown in FIG. 3, in which the acousto-optic cell is driven by two transducer elements, out of phase with each other. (While two transducers are shown, embodiments with more than two transducers are possible.) For such a combination, there will always be an acoustic disturbance present in the chopper, as long as the rf driver is on. In FIG. 3, a two-phase acousto-optic refractive modulator or chopper 120 has a pair of transducers 124 and 125 bonded to the optical medium 122. Alternatively, the two transducers can be bonded to the opposite faces. A means 126 for generating the input to the transducers 124 and 125 includes a means 127 for shifting the phase of the input to one transducer 124 relative to the input to the other transducer 125. The signals being applied to each transducer and the phase shift between the signals is shown by the two signal tracings of FIG. 4. The upper trace "A" is that of the base frequency signal as it is applied to transducer 124 and the lower trace "B" is the phase shifted signal applied to transducer 125. The chopping frequency consists of a period during which the signals are applied to the transducer as at "a" and a period during which no signal is applied as at "b". Two complete chopper or on-off cycles are shown.

By way of further explanation, the principle of one embodiment of this invention's operation is that if the focal length change is sufficient to cause the rays to come to a focus within the chopper material then the rays are diverging as they leave the high index of refraction material and, at exit, the diverging angle increases so that the optical energy misses the detector array completely. Now the variation in focal length is a function of the instantaneous acoustic energy in the material so that during the "Chopper Closed" time, the focal length would change from infinity to some minimum value twice at each RF cycle if only a single transducer and single RF source were used. However, if a multiple transducer array is used with two RF sources out of phase, an almost constant value of focal length is maintained during the "chopper closed" burst of RF energy and therefore the incoming infrared energy is imaged away from the detector array throughout this period.

The chopper concept depends for its operation on the effect of an acoustic wave upon the refractive index of an optical medium. The change of refractive index in the presence of an acoustic strain is $$\Delta n = \frac{1}{2} n^3 p e$$

where p is the photo-elastic constant and e is the strain amplitude resulting from the acoustic wave. Most devices using this physical effect operate in the Bragg diffraction mode, in which there are many acoustic wavelengths across the optical aperture, so that the light is diffracted, as with a diffraction grating. In the concept we describe here, the width of the optical beam may only be one half or perhaps a small number of acoustic wavelengths, so that the principle effect of the acoustic wave is to cause refraction, rather than diffraction of the light beam. Refraction results from the fact that there is a gradient of refractive index across the aperture, which is both time and spatially varying as the wave progresses. By establishing a standing acoustic wave across the optical aperture, the gradient becomes spatially fixed, but still varies with time. There are some advantages to using the refractive effect rather than the diffractive effect on the incident light for operation as a broadband optical chopper or shutter. Perhaps most important, the refractive mechanism is itself achromatic; ignoring the dispersion of the material, light of all wavelengths undergo the same modulation, for a given acoustic power level. On the other hand, the efficiency of modulation by diffraction varies as $1/\lambda^2$, so that different spectral components of incident light will be chopped with different extinction ratios. Another advantage of the refractive effect is that lower acoustic frequencies are used, since large acoustic wavelengths are required. In general lower frequencies are more easily generated and coupled, and cause fewer electromagnetic interference problems. Typical operating frequencies would be around several megahertz.

The standing acoustic wave may be thought of as establishing a lens-like behavior in the chopper medium, whose focal-length will vary in time as the standing wave intensity varies. When the intensity goes through zero, the focal length (for non-contoured faces) is infinite, and over a complete cycle will vary between a peak positive and peak voltage value. The spatial distribution of the refractive index will be given by:

$$n(x) = n_0 \pm \Delta n \cos(2\pi x/\Lambda)$$

where $\Lambda$ is the acoustic wavelength. Such an index distribution does not lead to a perfect lens; i.e., it is not possible to image except through a very small aperture. However, for operation of a chopper or shutter no imaging is required. All that is required is that when the shutter is closed, light is removed from the normal focus, with a high contrast ratio. In order to determine the contrast ratio that could be achieved for a given acoustic power level, it is necessary to carry out a ray trace for a large number of rays, and then statistically determine the ratio of the number of rays passing through a given aperture in the focal plane with the shutter open and closed (i.e. with and without acoustic power present). Since it is desired only to scatter the light rays, it may be desirable to choose the acoustic wavelength so that more than one antinode is set up in the shutter. The advantage of this is that for a given acoustic power level, the index gradient, and therefore the refractive power, is just proportional to the number of half waves set up. The number of half waves must not, however, be so large that the diffractive effect becomes dominant.

An order of magnitude estimate of the effect to be expected from acoustic refraction can be obtained by assuming that focusing does occur, and estimating the focal length for a given acoustic power level. This focal length can be calculated by assuming it is the same as that resulting from a parabolic refractive index distribution for which the peak index deviation is the same. For a parabolic index distribution, the refractive index can be expressed as:

$$n(r) = n_0(1 - ar^2/2)$$

where r is the distance from the axis of the lens and a is a measure of the gradient. It is well known that the focal length of a parabolic gradient lens is:

$$f.l. = \frac{1}{n \cdot a \cdot \sin(aT)}$$

where T is the length of the lens. For a lens element that is ½ an acoustic wavelength in diameter, $R = \Lambda/4$:

$$\Delta n(R) = -n_0 a \Lambda^2/32 = -n_0^3 p e_o/2$$

and the equivalent parabolic lens constant is:

$$a = 16 n_0 p e_o/\Lambda^2$$

Choosing germanium as the interaction medium, $n_o = 4$ and $p = 0.41$. In order to establish a very large strain amplitude, say $e_o = 10^{-5}$, the required acoustic power density will be very high;

$$I = \rho v^3 e^2/2 = 4.45 \text{ watts/cm}^2$$

However, by using resonant enhancement of the acoustic power, with $Q = 10$, this reduces to 0.45 watts/cm² which can be managed. At a frequency of 11 mhz, $\Lambda = 0.05$ cm and $a = 0.42$. If the lens length T is chosen so that $\sin(aT) = 1$, the result is $T = 2.42$ cm, and the focal length of the acoustic lens is 0.39 cm. For this frequency, the optical aperture contains an array of many lens elements, and there will be light focused at many points. With proper design, however, the objective of removing light from the primary focus of the optical system can be achieved with high contrast ratio.

An analysis of an infrared chopper based on the refraction of light rays by a low frequency standing acoustic wave in a block of germanium is found in *Acousto-Optic Refractive Infrared Chopper*, M. Gottlieb and F. Schaff; Applied Optics, Vol. 20, No. 19; 1 Oct. 1981, which is incorporated herein by reference.

In an alternative embodiment of this invention, an acousto-optic device is utilized to dissipate undesired laser emissions which could possibly damage the sensor optical system after optical gain has occurred, say at the detectors themselves. An increasing number of the E-O sensor systems utilize acousto-optical devices for a variety of purposes including variable spectral filters, fixed narrow band spectral filters, and optical energy choppers (as described above). The refractive mode of acousto-optic modulation according to the method and apparatus of this invention can be utilized to defocus or blank an optical system so that all undesired energy is dissipated within the acousto-optic device rather than at the more delicate, higher gain optical components or the detectors themselves.

Figure 5:
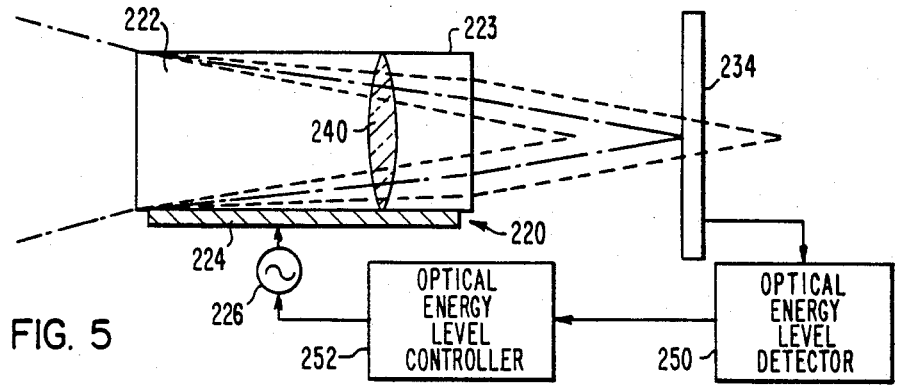

In the acousto-optic chopper 20,120 of FIGS. 1 through 3, the means for providing an input to the transducer is pulsed to alternately focus and unfocus the optical ray passing through the optical medium. In one embodiment, the dual mode acousto-optic device 220 of FIG. 5 is utilized in two modes of operation: the quiescent mode, when no energy is applied and the active mode, when energy is applied to the transducers. The dual-mode device 220 comprises an optical medium 222 to which a transducer 224 is bonded opposite a parallel face 223. A means 226 for providing an input to the transducer 224 is in communication therewith. A detector device 234 is positional at the focal plane of the optical ray refracted by the optical medium in its quiescent state. The acoustically induced "lens" 240 is a function of the energy applied to the transducer which ranges from a focus at some point, i.e. detector 234, when no energy is applied to a focus that causes total internal reflection or at least sufficient deflection from the normal optical path 230 (shown in solid lines) that all energy exiting the acousto-optic device is removed from its normal optical path. Experimental results indicate that the deflection of light rays on-axis beam normal to the acoustic source are deflected. The finite length of the aforedescribed lensing action creates sufficient non-uniformities within the optical medium to cause deflection of all incoming energy regardless of input angle or location. It should, of course, be appreciated that a detector means for determining that an excessive radiation is present is required. Such a device, represented schematically at 250 would be in communication via the controller 252 with the input generating means 226 to actuate the same so that the refractive mode protection can be activated for the duration of the undesired emissions.

The acousto-optic refractive protection technique disclosed herein can be utilized with any of a variety of acousto-optic devices which have a pair of sides parallel to each other and normal to the incoming optical energy. Thus, if an acousto-optic device is already built into a system which is potentially subject to excessive radiation, it can be simply modified to add a detector and a transducer with generator means on one side of a pair of parallel faces normal to the incoming optical energy.

Figure 6:
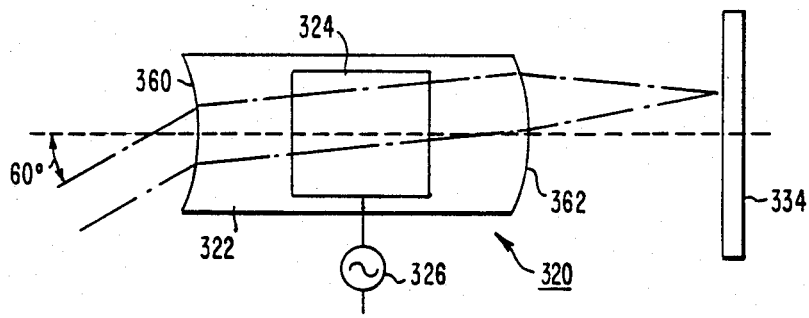
FIG. 6 is a schematical illustration of an acousto-optic modulation device with optical elements incorporated therein, all according to the present invention.

The acousto-optic devices thus far described have consisted of a component which can be inserted into optical system with certain dimensional modifications. These optical systems typically include one or more optical elements as shown in FIG. 1 where an optical array places the optical rays on the acousto-optic device. In the embodiment illustrated in FIG. 6, the acousto-optic device 320 includes at least one transducer 324 and a means 326 for generating the input thereto. While a single transducer configuration is illustrated herein, a two-phase configuration can be readily employed. Rather than having the planar input and output faces of the other embodiments, the acousto-optic device 320 can be provided with at least one and as illustrated in FIG. 6, two contoured surfaces 360 and 362 with optical power. This renders a single component modulator/lens combination which can be the only optical component required in the system. For example, the embodiment of FIG. 6 determines the angle of arrival of collimated optical energy for a range of about ±60° in the plane normal to the acoustic wave and about ±1° in the plane of the acoustic wave.

We claim:

1. A method of refracting an optical ray comprising the steps of:
   passing said optical ray through an optical medium to establish a first focal point in a quiescent mode; and
   launching acoustic waves into said optical medium to induce a refractive index gradient within said optical medium, refracting the optical ray from said first focal point to at least a second focal point in an active mode.

2. The method of refracting an optical ray according to claim 1 including the step of alternating said optical medium from the quiescent mode to the active mode at a predeterminal rate, thus alternately refracting the optical ray from the first focal point to the at least one second focal point.

3. The method of refracting an optical ray according to claim 2 wherein the acoustic waves are launched into the optical medium at a first location thereon and including the steps of launching additional acoustic waves into said optical medium from a second location thereon, and phase shifting the additional acoustic waves launched into the optical medium relative to the other acoustic waves.

4. The method of refracting an optical ray according to claim 2 wherein the optical ray is refracted from the first focal point to the at least one second focal point to effect the chopping of said optical ray relative to said first focal point when the acoustic waves are launched into the optical medium from a first location in the active mode, the chopping frequency being twice that of the alternation of the optical medium between the quiescent mode and the active mode.

5. The method of claim 1 wherein the optical ray is an undesired level of emission and the method includes the steps of detecting said emission, and continuously launching acoustic waves into the optical medium to refract the optical ray away from the first focal point for the duration of the time which said emission is detected.

6. An acousto-optic device for the refraction of an optical ray from a first focal point to at least one other focal point comprising:
   an optical medium through which the optical ray travels to establish the first focal point, said optical medium including an optical input face and an optical output face and a pair of parallel sides, wherein said sides are parallel to the optical ray traveling through said optical medium and at least one of said optical input or output faces is contoured and has optical power; and
   means associated with said optical medium to selectively launch acoustic waves into said optical medium normal to said optical rays traveling therethrough, said acoustic waves inducing a refractive-index gradient within said optical medium to refract said optical ray from said first focal point to said at least one other focal point.

7. The acousto-optic device according to claim 6 wherein the means to selectively launch acoustic waves into the optical medium includes at least one transducer means bonded to one side of the pair of parallel sides.

8. The acousto-optic device according to claim 7 wherein the means to selectively launch acoustic waves into the optical medium includes means to selectively generate an input signal to said at least one transducer means.

9. The acousto-optic device according to claim 8 including two transducer means to launch acoustic waves into the optical medium and wherein the means for generating the input signal to said transducer means includes means for providing an input signal having a first phase to one of said transducer means and an input signal of a phase shifted relative to said first phase to the other of said transducer means.

10. The acousto-optic device according to claim 6 wherein both the optical input face and optical output face are contoured.

11. The acoustic optic device according to claim 7 including means to detect undesired levels of emissions, said detection means being in communication with the means to selective launch acoustic waves into the optical medium whereby acoustic waves are launched into said optical medium to refract said emissions passing therethrough.

12. In a photon energy detection system which requires a chopper between the impinging energy and a detector, an acousto-optic chopper apparatus comprising: an optical medium having an optical input face and an optical output face at least one of said optical input or output faces being contoured and having optical power, and a pair of parallel sides which are parallel to the photon energy passing through said optical medium, said optical medium refracting said photon energy to a first focal point, and means to selectively launch acoustic waves into the optical medium, said acoustic waves being normal to the path of said photon energy and inducing within said optical medium a refractive index gradient which deviates said photon energy from said first focal point to at least one other focal point.

13. An acousto-optic device for the refraction of an optical ray from a first focal point to at least one other focal point comprising:

an optical medium through which the optical ray travels to establish the first focal point; and means associated with said optical medium to selectively launch acoustic waves into said optical medium normal to said optical rays traveling therethrough, said acoustic waves inducing a refractive-index gradient within said optical medium to refract said optical ray from said first focal point to said at least one other focal point, said associated acoustic wave launching means including at least two transducer means to launch said acoustic waves and means to selectively generate an input signal having a first phase to one of said transducer means and an input signal of a phase shifted relative to said first phase to the at least one other of said transducer means.

* * * * *